Dec. 30, 1958 W. M. SANDERSON 2,866,494
METHOD FOR TIRE PUNCTURE REPAIR
Filed July 12, 1954 2 Sheets-Sheet 1

*INVENTOR.*
WILLIAM M. SANDERSON
BY
*R. L. Miller*
ATTORNEY

Dec. 30, 1958     W. M. SANDERSON     2,866,494
METHOD FOR TIRE PUNCTURE REPAIR
Filed July 12, 1954     2 Sheets-Sheet 2

INVENTOR.
WILLIAM M. SANDERSON
BY
ATTORNEY

United States Patent Office 2,866,494
Patented Dec. 30, 1958

2,866,494

METHOD FOR TIRE PUNCTURE REPAIR

William M. Sanderson, Akron, Ohio, assignor to The Goodyear Tire & Rubber Company, Akron, Ohio, a corporation of Ohio Application July 12, 1954, Serial No. 442,465

12 Claims. (Cl. 154—14)

This invention relates to a method and apparatus for the repair of punctures in a tire wall and more particularly to a tool and tire plug and method of utilizing the combination to effect the repair of a puncture in a tubeless tire from outside the tire proper.

The rapid development and acceptance by industry of the type of tires known as tubeless tires has created the associated problem of the repair of punctures in this type of tire. Heretofore, in conventional assemblies utilizing an air-retaining tube and an overlying tire, the repair of punctures generally has been confined to the tube itself for reasons which are obvious. The elimination of the tube, with the consequent necessity for maintaining the internal pressure solely by the tire itself, has posed a puncture repair problem to which the known techniques of tube repair are inapplicable. It is to this problem that this invention is related.

The general object of this invention is to provide a method and apparatus for the repair of tubeless tire punctures whereby the repair may be effected on a mounted tire from a station external thereto, without extensive preliminary preparation.

Another object of the invention is to provide for a method of repair that requires no special skill or elaborate apparatus and can be accomplished in a straightforward and efficient manner utilizing materials of economical and simple production.

Still another object of the invention is to provide for a method of repair whereby the repair plug is quickly and positively located in proper positioning within the puncture from a station external the tire.

Yet another object of the invention is to provide a tire repair tool and plug, the use of which results in a permanent repair and seals against the loss of air pressure from within the tire and the deleterious entrance from without the tire of foreign substances such as water, grit, etc.

The foregoing objects of the invention, and other objects which will become apparent as the description proceeds, are achieved by the provision of a tire plug and an insertion tool therefor; the plug having two sections: a puncture-plugging section and a manipulating section. The tool is engaged to the manipulating section and the whole is then inserted into the puncture. As the tool and manipulating section progress through the puncture length, the plugging section is drawn therein. When the plugging section is in proper position to effect the repair, a discernible indication that such positioning has been achieved is signalled to the operator, who then withdraws the tool, leaving the plug in the puncture. The repair is completed by trimming off the excess material and the tire is then inflated and ready for immediate service.

Figure 1:
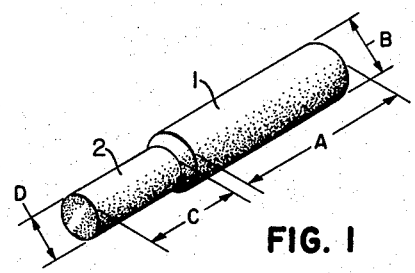
Fig. 1 is a view of a form of a tire plug as utilized in the invention.

A preferred embodiment of a tire plug is shown in Fig. 1. Although formed of a single piece of elastomeric material, the plug has two sections: a plugging section 1 and a manipulating section 2. As indicated in Fig. 1, both sections are preferably cylindrical in form with the plugging section 1 of a length A and a diameter B, and the manipulating section 2 of a length C and a diameter D. At the junction of the two sections 1 and 2, a short tapered portion may be provided to avoid any abrupt transition therebetween which would adversely affect insertion of the tire plug.

Figure 2:
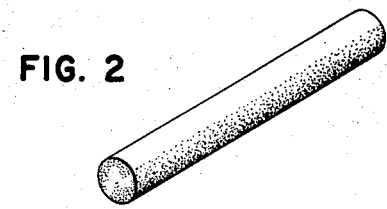
Fig. 2 is a view of a dimensionally limited form of a tire plug.

While the dimensions of the manipulating section 2 are predetermined by the resiliency characteristics of the elastomeric material of construction as is hereinafter described in greater detail, the diameter B of the plugging section 1 varies through a range of sizes proportioned to the average cross-sectional area of the puncture. Consequently, from a practical standpoint, a dimensional limitation is reached when the diameter B of the plugging section 1 is the same as the diameter D of the manipulating section 2. The resulting form of tire plug is shown in Fig. 2, being a straight cylindrical shape with no transition zone present.

Figure 3:
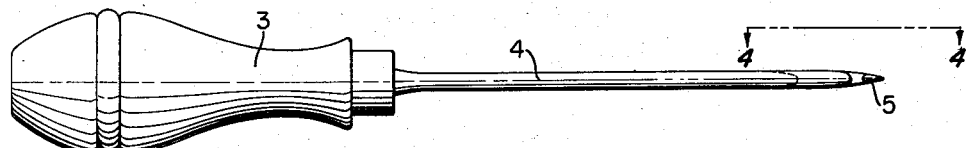
Fig. 3 is a view of a preferred embodiment of the plug-inserting tool of the invention.
Figure 4:
Fig. 4 is a view of the plug-engaging portion of the tool.
Figure 5:
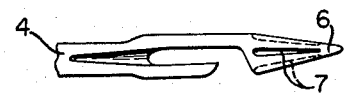
Fig. 5 is a view of another variation of the plug-engaging portion of the tool.

The repair tool utilized in the practice of the invention is shown in Fig. 3, and preferably consists of a handle 3 having suitably mounted therein an elongated needle-like shaft 4 preferably constructed of tempered steel. Figs. 4 and 5 show enlarged constructional details of two forms of the plug-engaging end of the shaft 4. In Fig. 4 a hook is shown of substantially C-shaped form with the opening of the C-shape substantially parallel to the axis of the shaft 4; the terminus 5 of the shaft 4 being of tapered form with rounded point. A modification of the hook is shown in Fig. 5 wherein the terminus 6 is of gradual taper and has incorporated therein surface grooves 7 for the retention of lubricant and adhesive; the use and function of the latter being apparent as the description proceeds.

The operation of the method of the invention is as follows: leaving the tire on the rim, the puncture is located and the puncturing object is removed if still in the puncture. The tool of Fig. 3 is then preferably dipped into a suitable fluid having one or both the properties of a rubber lubricant and adhesive. A preferred fluid in the practice of the invention is one such as vulcanizable rubber cement. The tool of Fig. 3, with about one-half of the length of the shaft 4 wetted with fluid, is inserted into the puncture and gradually worked through the puncture length with a twisting motion. The purpose in this preliminary step is dual in nature; being firstly to orientate for the operator the direction of the puncture length with respect to the tire, and secondly to coat the entire wall of the puncture with the fluid. The process may be repeated until the tool slips into and through the puncture length quite easily and with a minimum of effort.

Figure 6:
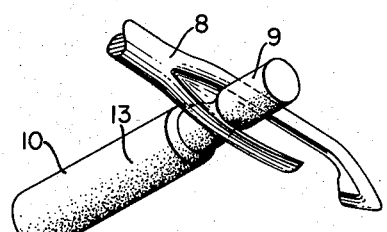
Fig. 6 is a view of the engaged relationship of a tire plug and the tool.
Figure 7:
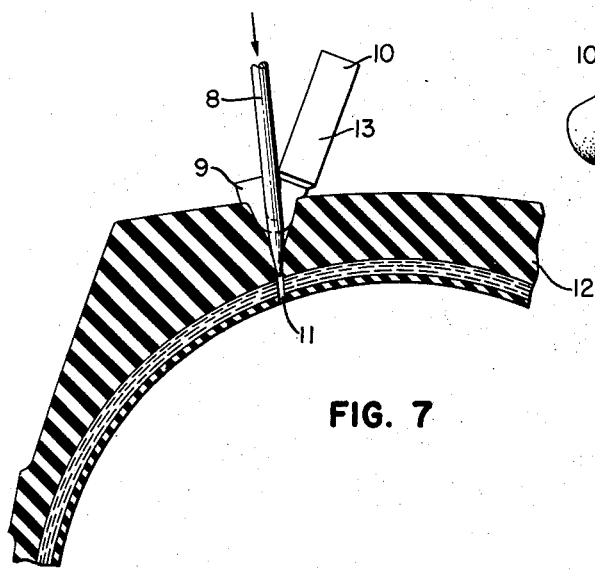
Fig. 7 is a view of the initial positioning of plug and tool in a tire puncture.
Figure 8:
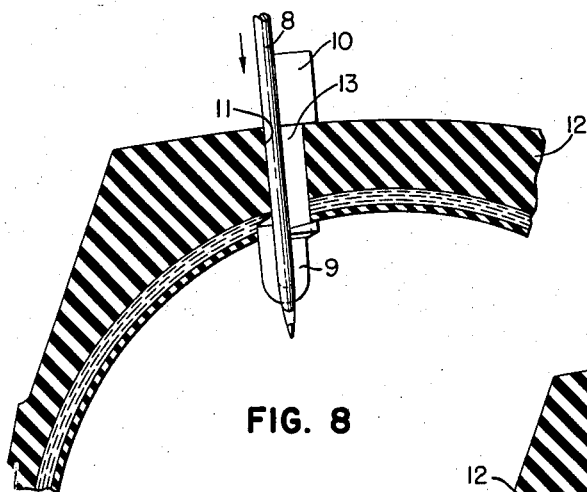
Fig. 8 is a view of the plug and tool just before the free end of the guiding section is released.
Figure 9:
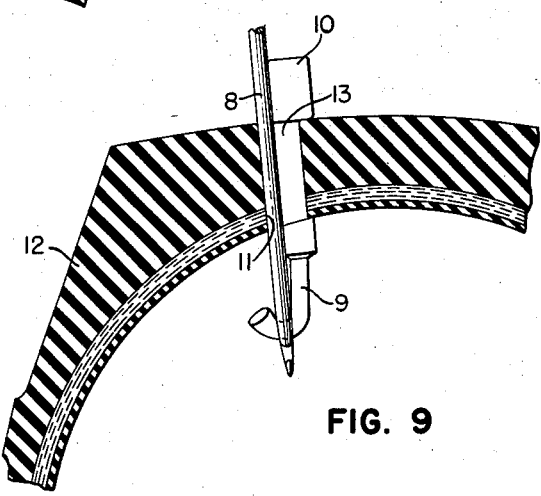
Fig. 9 is a view of the plug and tool just after the said free end is released.

As shown in Fig. 6, the tool 8 is then engaged with the manipulating section 9 of a tire plug 10. In the preferred method of the invention, the plug design is such that the diameter of the plugging section 13 is approximately twice that of the diameter of the puncture or the puncture-forming object if the latter is available for inspection. In Fig. 7 the combination of the tool 8 and the plug 10 is shown entering the puncture 11 in a tire 12. To facilitate passage of the tool 8 and plug 10 through the puncture 11, both the tool and plug are preferably dipped and coated with a lubricant such as vulcanizable rubber cement prior to entrance being effected into the puncture. The position of the needle 8 is such that the manipulating section 9 of the plug 10 is doubled-back on its own length. As shown in Fig. 8, as the tool 8 is progressed along the puncture 11, the manipulating section 9 of the plug 10 is stretched and causes the entrance of the plugging section 13 into the puncture 11. In Fig. 8, the free end of the manipulating section 9 is in a position such that only a slight further advancement of the shaft 8 through the puncture 11 will cause the release of the free end from the restraining confinement of the walls of the puncture 11. Fig. 9 shows the situation immediately after the free end of the manipulating section 9 is released. The "snap" or "pop" of the released end is a discernible indication to the operator that the plugging section 13 has been sufficiently advanced along the puncture length and is in proper positioning. The importance of proportioning the manipulating section 9 to the resiliency ceharacteristics of the elastomeric material of construction will now be apparent. The diameter and length of the section 9 are factors that determine the point at which the free end of the section 9 will "pop." These variables and the point of engagement of the tool 8 and the section 9 are predetermined so that when the free end is released, the plugging section 13 is in proper position; that position being the point at which some portion of the section 13 has passed through the puncture 11 and emerged internally of the tire 12. It will be evident that since an important object of the method of this invention is to effect a repair from a station external the tire 12 while said tire 12 is mounted on the vehicle, the operator cannot visually inspect the plug to note when the plugging section 13 is properly placed. The portion of the section 13 visible to the operator does not give a clear indication of the degree of penetration as the puncture length will vary between repair jobs, being a function of the type of tire, angle of puncture, etc. However, with the method of the invention, the operator is given a discernible indication of the point at which the tool 8 may be safely withdrawn.

Figure 10:
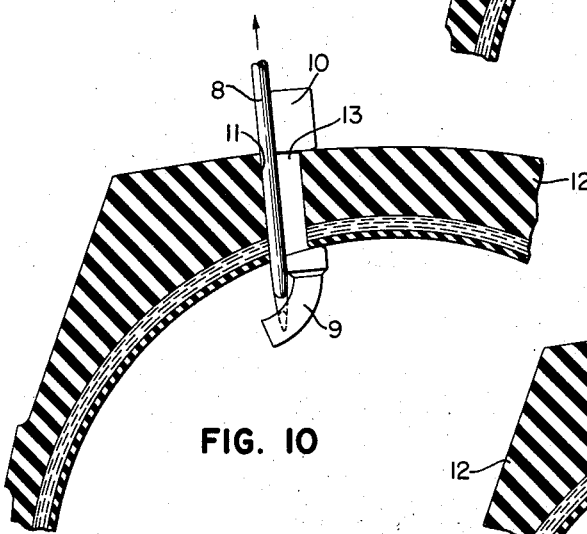
Fig. 10 is a view of the relationship existing as the tool is withdrawn.
Figure 11:
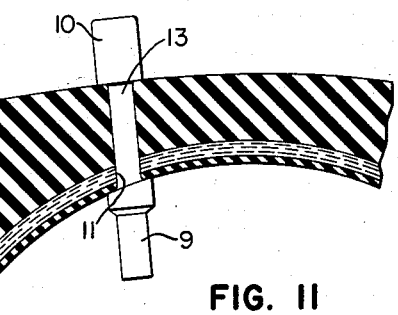
Fig. 11 is a view of the tire plug in the puncture after the tool has been removed.

As shown in Fig. 10, as the tool 8 is withdrawn from the puncture 11, at some point during the withdrawal, the manipulating section 9 will disengage from the tool 8 and the tool 8 may be completely removed, leaving the plug 10 in the position shown in Fig. 11.

Figure 12:
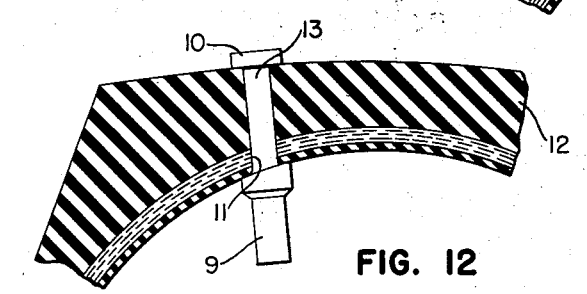
Fig. 12 is a view of the completed repair.

The exterior portion of the plugging section 13 is then trimmed, preferably leaving a "button" on the surface of the tire 12 as shown in Fig. 12. The resulting assembly is now securely in position and the tire 12 may be immediately inflated and utilized for normal service. In the preferred embodiment of the invention wherein a vulcanizable rubber cement is utilized as a lubricant, a subsequent curing of the cement will further secure the repair plug 10 within the tire 12 by acting as an adhesive.

The following tabulation is an example of the dimensional characteristics of the tire plug and tool design.

(Refer to Fig. 1 for dimensional nomenclature used below:)

| | A, inches | B, inches | C, inches | D, inches | Material |
|---|---|---|---|---|---|
| #1 Size Plug | 1 | ¼ | ½ | ¼ | Truck Tube Compound. |
| #2 Size Plug | 1 | 5/16 | ½ | ¼ | Do. |
| #3 Size Plug | 1 | ⅜ | ½ | ¼ | Do. |

Repair tool having a shaft 4″ in overall length; shaft diameter: ⅛″; width of the C-shape normal to shaft axis: 5/64″; length of C-shape along shaft axis: ⅜″; and width of opening of C-shape: 3/32″.

The dimensions shown above are applicable to the truck tube compound resiliency characteristics. It will be obvious that if other elastomeric materials are utilized, a resizing of the tire repair plug can be made to provide for a "popping" indication at the point whereat the plug is in position.

While certain representative embodiments and details have been shown for the purpose of illustrating the invention, it will be apparent to those skilled in this art that various changes and modifications may be made therein without departing from the spirit or scope of the invention.

I claim:

1. The method of repairing a puncture in a mounted tubeless tire with a plug of elastomeric material having a first manipulating section and a collinear second puncture-plugging section, comprising the steps of inserting the first section of the plug into the puncture opening on the exterior surface of said tire by applying a tractive force to the first section at a predetermined point thereon intermediate its length to effect the entrance of the first section into the puncture in a position doubled-back on its length; advancing the first section in said position through the puncture length toward the tire interior to stretch the first section and pull the second section into the puncture with consequent stretching thereof; terminating the application of said force thus discontinuing said advance when the free end of the first section enters the tire pressure chamber and is released of the restraint imposed thereon by the confining walls of the puncture and snaps out of the doubled-back relation with the rest of said first section into a relaxed state to signal by a discernible indication that, due to the initial engagement in a predetermined relationship of the first section and the point of application of said force, the second section is properly positioned within the puncture length reversing the direction of force on the said first section to disengage said force from said first section and said elastomeric plug.

2. The method described in claim 1 in which the plug surface and the puncture walls are coated with a lubricant prior to the insertion of the plug to facilitate said insertion.

3. The method described in claim 2 in which the lubricant is also an adhesive to secure the plug to the walls of the puncture.

4. The method of repairing a puncture in a mounted tubeless tire with a plug of elastomeric material having a first manipulating section and a collinear second puncture-plugging section and a rigid inserting tool therefor, comprising the steps of engaging the tool with the first section of said plug at a predetermined point thereon intermediate its length; inserting the tool and first section engaged therewith into the puncture opening on the exterior surface of said tire to effect the penetration therein of the first section in a position doubled-back on its length; advancing the tool through the puncture length toward the tire interior to stretch the first section and pull the second section into the puncture with consequent stretching thereof; discontinuing said advance when the free end of the first section enters the tire pressure chamber and is released of the restraint imposed thereon by the confining walls of the puncture and snaps out of the doubled-back relation with the rest of said first section into a relaxed state thus signalling by a discernible indication that, due to the initial engagement in a predetermined relationship of the first section and the tool, the second section is properly positioned within the puncture length; retracting said tool along the previous line of advance whereby said tool is disengaged from the said first section and withdrawing the tool from the tire.

5. The method described in claim 4 in which the tool, plug, and puncture walls are coated with a lubricant prior to the insertion of the plug to facilitate said insertion.

6. The method described in claim 5 in which the lubricant is also an adhesive to secure the plug to the walls of the puncture.

7. The method of repairing a puncture in a mounted tubeless tire with a plug of elastomeric material having a first manipulating section and a collinear second puncture-plugging section, comprising the steps of inserting the first section of the plug into the puncture opening on the exterior surface of said tire by applying a force intermediate the length of the first section to effect the entrance thereof into the puncture in a position doubled-back on its length; advancing the first section constrained in said doubled-back position by the puncture walls through the puncture length toward the tire interior to stretch the first section and pull the second section into the puncture with consequent stretching thereof; continuing said advance until the second section is positioned within the puncture length and said first section is released from said constraint whereby it snaps toward its original collinear relation with said second section; and finally releasing said force previously acting on the first section.

8. The method described in claim 7 in which the plug surface and the puncture walls are coated with a lubricant prior to the insertion of the plug to facilitate said insertion.

9. The method described in claim 8 in which the lubricant is also an adhesive to secure the plug to the walls of the puncture.

10. The method of repairing a puncture in a mounted tubeless tire with a plug of elastomeric material having a first manipulating section and a collinear second puncture-plugging section and a rigid inserting tool therefor, comprising the steps of engaging the tool intermediate the length of the first section; inserting the tool and first section engaged therewith into the puncture opening on the exterior surface of said tire to effect the penetration therein of the first section in a position doubled-back on its length, advancing the tool with said first section constrained in said doubled-back position by the puncture walls through the puncture length toward the tire interior to stretch the first section and pull the second section into the puncture with consequent stretching thereof; continuing said advance until the second section is positioned within the puncture length and said first section is released from said constraint whereby it snaps toward its original collinear relation with said second section; disengaging said tool from said first section and finally withdrawing the tool from the tire.

11. The method described in claim 10 in which the tool, plug and puncture walls are coated with a lubricant prior to the insertion of the plug to facilitate said insertion.

12. The method described in claim 11 in which the lubricant is also an adhesive to secure the plug to the walls of the puncture.

References Cited in the file of this patent

UNITED STATES PATENTS

| | | |
|---|---|---|
| 90,485 | Baker | May 25, 1869 |
| 596,165 | Jencks | Dec. 28, 1897 |
| 634,193 | Wingate | Oct. 3, 1899 |
| 931,056 | Glanz | Aug. 17, 1909 |
| 1,000,168 | Glanz | Aug. 8, 1911 |
| 2,612,930 | Hawkinson | Oct. 7, 1952 |
| 2,668,570 | Pfeifer | Feb. 9, 1954 |